US012262806B2

(12) United States Patent
McGrath

(10) Patent No.: US 12,262,806 B2
(45) Date of Patent: Apr. 1, 2025

(54) COSMETIC-PRODUCT PACKAGING AND METHOD OF MANUFACTURE THEREOF

(71) Applicant: Pat McGrath Cosmetics LLC, New York, NY (US)

(72) Inventor: Patricia McGrath, New York, NY (US)

( * ) Notice: Subject to any disclaimer, the term of this patent is extended or adjusted under 35 U.S.C. 154(b) by 849 days.

(21) Appl. No.: 17/493,931

(22) Filed: Oct. 5, 2021

(65) Prior Publication Data

US 2022/0104602 A1 Apr. 7, 2022

(30) Foreign Application Priority Data

Oct. 6, 2020 (GB) ...................................... 2015813

(51) Int. Cl.
*A45D 40/24* (2006.01)
*A45D 34/00* (2006.01)
(Continued)

(52) U.S. Cl.
CPC ............. *A45D 40/24* (2013.01); *A45D 34/00* (2013.01); *B31B 50/20* (2017.08);
(Continued)

(58) Field of Classification Search
CPC .......... B65D 21/00; B65D 21/02; B65D 5/50; B65D 5/48; B65D 5/48028; B65D 5/48034; B65D 5/503; B65D 5/38; B65D 77/0453; B65D 77/0446; B65D 77/042; B65D 77/0413; B65D 77/04
(Continued)

(56) References Cited

U.S. PATENT DOCUMENTS 5,407,076 A * 4/1995 Sabet ..................... B65D 5/509 206/472
6,354,308 B1 * 3/2002 Kuk ..................... A45C 13/008 206/581
(Continued)

FOREIGN PATENT DOCUMENTS

EP 2690025 A1 1/2014

OTHER PUBLICATIONS

Combined Search and Examination Report under Section 17and 18(3) issued in GB Application No. GB1904778.6 on Sep. 24, 2019, 06 pages.

*Primary Examiner* — Javier A Pagan
(74) *Attorney, Agent, or Firm* — RC Trademark Company

(57) ABSTRACT

There is disclosed is a cosmetic-product packaging. The cosmetic-product packaging includes an outer container, an inner container and a lid. The lid is pivotally coupled to the outer container. The outer container and the lid are provided with at least one lid projecting tab and at least one container projecting tab, such that a distal end of the lid projecting tab clips onto a distal end of the container projecting tab to secure the lid in a closed position to the outer container. The inner container is mountable within outer container. Furthermore, the inner container, in operation, accommodates a cosmetic product. The inner container is user-accessible when the lid is in open position, i.e. the distal ends of projecting tabs are spatially mutually separated, for accessing the cosmetic product. The inner container comprises customizable holding tabs and a planar side panel of the outer container is reflective.

20 Claims, 9 Drawing Sheets

(51) Int. Cl.
*B31B 50/20* (2017.01)
*A45D 40/00* (2006.01)
*B31B 105/00* (2017.01)
*B31B 110/35* (2017.01)
*B31B 120/10* (2017.01)

(52) U.S. Cl.
CPC .................. *A45D 2034/002* (2013.01); *A45D 2040/0006* (2013.01); *A45D 2200/205* (2013.01); *B31B 2105/00* (2017.08); *B31B 2110/35* (2017.08); *B31B 2120/102* (2017.08)

(58) Field of Classification Search
USPC .............. 220/23.87, 23.9, 23.91; 229/117.28
See application file for complete search history.

(56) References Cited

U.S. PATENT DOCUMENTS

| | | | | |
|---|---|---|---|---|
| 6,400,247 | B1 * | 6/2002 | King ...................... | B65D 85/00<br>220/8 |
| 2011/0259895 | A1 * | 10/2011 | Parenteau ............... | E04C 2/365<br>220/592.2 |
| 2014/0346072 | A1 * | 11/2014 | Jacobson ............... | A61B 50/33<br>53/449 |

* cited by examiner

COSMETIC-PRODUCT PACKAGING AND METHOD OF MANUFACTURE THEREOF

TECHNICAL FIELD

The present invention relates generally to product packaging, and more specifically to cosmetic-product packaging that protects cosmetic products during transport, presentation for sale and eventual assistance with use of the cosmetic products by users. Moreover, the present invention also relates to methods of (for) manufacturing the aforesaid cosmetic-product packaging.

BACKGROUND

Cosmetic products for human beautification and skin treatment purposes are well known and have been used by humans for thousands of years. Various types of packaging have been used for providing cosmetic product protection en route from cosmetic product manufacturers to eventual customers. However, many customers, usually, discard the cosmetic product packaging after purchasing the cosmetic products or after having finished using the cosmetic products; such discarding adds to waste, for example a non-degradable waste, such as plastics material waste, within the environment. Furthermore, such packaging for cosmetic-products either are not transparent and thus reduce visibility of the product, or, when transparent, expose the cosmetic product to harmful ultraviolet radiation that may damage it.

More recently, there has been a growing concern about adapting human society to a more sustainable utilization of resources, such as more sustainable use of energy and materials, with an emphasis on reducing waste, in particular plastics material waste. It will be appreciated that disposing of such wastes, by way of dumping into ground or water bodies, can result in plastics-material particles in soil and water bodies like rivers and oceans. Such disposal of plastics material, results in impaired fertility of the soil and reduce potability and alternative uses of water. In addition to non-degradable waste, wastage of non-renewable resources such as paper-based packaging, further raises concerns for sustainable utilization of resources. It will be appreciated that if the packaging of a cosmetic product is designed to have a use beyond the transportation purposes, the user is less likely to discard the packaging, thereby reducing waste. In particular, if the packaging of a cosmetic product can be useful to the user for make-up related purposes, the packaging will not contribute to waste. However, manufacturing a multi-purpose packaging can lead to significantly inflated manufacturing costs and thus are often not adopted by manufacturers.

Therefore, there arises a need for a cosmetic-product packaging that not only provides protection for a given cosmetic product from manufacturer to a given customer as well as while in use by the user, but also aesthetically appeals and is useful to the given customer, such that the given customer retains and cherishes the cosmetic-product packaging for a long-term use, rather than merely discarding the cosmetic-product packaging at an earliest opportunity.

SUMMARY

The present invention seeks to provide a cosmetic-product packaging. Moreover, the present invention provides a method of (for) manufacturing the cosmetic-product packaging. The present invention seeks to provide at least a partial solution to an existing technical problem of protecting cosmetic products during storage and transportation. An aim of the present invention is to provide a solution that at least partially overcomes the aforesaid problems encountered in the known art.

In one aspect, the present invention provides a cosmetic-product packaging, characterized in that the cosmetic-product packaging includes:

(i) an outer container having a plurality of planar side panels, and a lid that is pivotally coupled to the outer container, characterized in that the outer container and the lid are provided with at least one container projecting tab and at least one lid projecting tab respectively, characterized in that a distal end of the at least one lid projecting tab clips onto a distal end of the at least one container projecting tab to secure the lid in a closed position to the outer container;

(ii) an inner container that is mountable within the outer container, characterized in that, in operation, the inner container accommodates at least one cosmetic product, and the inner container is accommodated within the outer container; and (iii) the inner container is user-accessible when the lid is in an open position, characterized in that the distal ends of the projecting tabs are spatially mutually separated, for accessing the at least one cosmetic product wherein the inner container comprises customizable holding tabs to ensure a snug fit of the at least one cosmetic product therein, and wherein at least one of the planar side panels of the outer container is arranged to be reflective for use in application of the one or more cosmetic products.

By "snug" is meant, for example, a clearance of less than 3 mm around the at least one cosmetic product, more optionally a clearance of less than 0.5 mm around the at least one cosmetic product; such a clearance allows convenient user access to the at least one cosmetic product without needing to apply undue force, but allows the at least one cosmetic product to be retained in position without rattle about during transit. Embodiments of the present invention substantially eliminate, or at least partially address, the aforementioned problems in the prior art and allow for a simple, more appealing, more durable and user-friendly cosmetic-product packaging, such that the customers retain the improved cosmetic-product packaging for various purposes, for example for protecting cosmetics products during storage and transporting in the customer's handbag, rucksack, bathroom or similar. Furthermore, the present invention provides for a substantial reduction in wastage of resources used in manufacturing the cosmetic-product packaging. Specifically, the customizable holding tabs ensure a snug fit of the at least one cosmetic product thereby eliminating substantial waste originating from cushioning elements used to protect the cosmetic product in transit. Furthermore, the cosmetic-product packaging provides a use to the user of the cosmetic-product by acting as a mirror for application of the cosmetic product, thereby ensuring that the user does not discard the packaging. Furthermore, as one of the planar side panels is manufactured to be reflective instead of incorporating a mirror into the packaging, the packaging is not bulky and is economical. Additionally, the present invention provides the cosmetic-product packaging that is reusable, recyclable and inexpensive in manufacture.

Optionally, the outer container and inner container are fabricated from paper- or cardboard-containing materials.

Optionally, the outer container has an elongate rectilinear shape, characterized in that the outer container includes planar end panels at two ends of the outer container, and characterized in that the lid includes a plurality of planar lid panels that are mutually pivotally attached, characterized in that a first planar lid panel is pivotally attached along an elongate edge of one of the plurality of planar side panels of the outer container, and characterized in that a second planar lid panel is provided with the at least one lid projecting tab, and one of the plurality of planar side panels of the outer container is provided with the at least one container projecting tab, such that the second planar lid panel is abutting in operation to at least one of the plurality of planar side panels of the outer container when the lid is in the closed position, and the first planar lid panel prevents access to the inner container when the lid is in the closed position.

Optionally, the plurality of planar side panels of the outer container surrounds the inner container on three lateral sides thereof.

Optionally, the outer container has an elongate length in a range of 5 cm to 20 cm along an elongate axis of the outer container, and a lateral width in a range of 1 cm to 4 cm in a lateral axis of the outer container, characterized in that the elongate axis is orthogonal to the lateral axis.

Optionally, the tabs have a lateral width in a range of 3 mm to 25 mm, and a length in a range of 3 mm to 10 mm.

Optionally, the tabs are integral to the outer container and the lid, and are formed by cutting into a material of the outer container and the lid.

Optionally, the tabs are formed by using plastics material inserts that are applied to the outer container and the lid during manufacturing thereof.

Optionally, one or more planar panels of the outer container and the lid are fabricated as multi-layer structures.

Optionally, at least one of the planar panels of the outer container and its lid is secured by adhesive bonding.

Optionally, one or more external surfaces of the outer container and the lid have a wipe-clean surface coating.

Optionally, the inner container is fabricated from a porous material that, in operation, absorbs liquid spills or oozing from the at least one cosmetic product. More optionally, the inner container is fabricated from corrugated cardboard.

Optionally, the lid and the outer container each include a plurality of mutually cooperating tabs.

Optionally, the inner container is of a rectilinear shape with planar side panels that abut to the planar side panels of the outer container, when the inner container is accommodated within the outer container.

Optionally, planar panels of the inner container completely surround the at least one cosmetic product when the inner container is accommodated within the outer container.

Optionally, one or more surfaces of the planar panels of the outer container are provided with a finish onto which graphical images are susceptible to being printed.

Optionally, at least one of the plurality of planar side panels are fabricated from at least one flexible plastics material that transmits electromagnetic radiation in a wavelength range to which a human eye responds but attenuates radiation in an ultra violet (UV) electromagnetic wavelength range.

Optionally, one of the plurality of planar side panels is arranged to have an elastic strap thereon configured to secure one or more objects therein.

In another aspect, the present invention provides a method of (namely, a method for) manufacturing a cosmetic-product packaging, characterized in that the method includes:

(i) fabricating an outer container having a plurality of planar side panels, and a lid that is pivotally coupled to the outer container, and providing the outer container and the lid with at least one container projecting tab and at least one lid projecting tab respectively, characterized in that a distal end of the at least one lid projecting tab clips onto a distal end of the at least one container projecting tab to secure the lid in a closed position to the outer container;

(ii) fabricating an inner container that is mountable within the outer container, characterized in that, in operation, the inner container accommodates at least one cosmetic product, and the inner container is accommodated within the outer container;

(iii) arranging for the inner container to be user-accessible when the lid is in an open position, characterized in that the distal ends of the projecting tabs are spatially mutually separated, for accessing the at least one cosmetic product;

(iv) arranging for the inner container to comprise customizable holding tabs to ensure a snug fit of the at least one cosmetic product therein; and (v) arranging for at least one of the planar side panels of the outer container to be reflective for use in application of the one or more cosmetic products.

By "snug" is meant, for example, a clearance of less than 3 mm around the at least one cosmetic product, more optionally a clearance of less than 0.5 mm around the at least one cosmetic product; such a clearance allows convenient user access to the at least one cosmetic product without needing to apply undue force, but allows the at least one cosmetic product to be retained in position without rattle about during transit.

Optionally, the method includes fabricating the outer container and inner container from paper- or cardboard-containing materials.

Optionally, the outer container has an elongate rectilinear shape, characterized in that the outer container includes planar end panels at two ends of the outer container, and characterized in that the lid includes a plurality of planar lid panels that are mutually pivotally attached, characterized in that a first planar lid panel is pivotally attached along an elongate edge of one of the plurality of planar side panels of the outer container, and characterized in that a second planar lid panel is provided with the at least one lid projecting tab, and one of the plurality of planar side panels of the outer container is provided with the at least one container projecting tab, such that the second planar lid panel is abutting in operation to at least one of the plurality of planar side panels of the outer container when the lid is in the closed position, and the first planar lid panel prevents access to the inner container when the lid is in the closed position.

Optionally, the method includes arranging for the plurality of planar side panels of the outer container to surround the inner container on three lateral sides thereof.

Optionally, the outer container has an elongate length in a range of 5 cm to 20 cm along an elongate axis of the outer container, and a lateral width in a range of 1 cm to 4 cm in a lateral axis of the outer container, characterized in that the elongate axis is orthogonal to the lateral axis.

Optionally, the tabs have a lateral width in a range of 3 mm to 25 mm, and a length in a range of 3 mm to 10 mm.

Optionally, the tabs are integral to the outer container and the lid, and are formed by cutting into a material of the outer container and the lid.

Optionally, the tabs are formed by using plastics material inserts that are applied to the outer container and the lid during manufacturing thereof.

Optionally, one or more planar panels of the outer container and the lid are fabricated as multi-layer structures.

Optionally, at least one of the planar panels of the outer container and its lid is secured by adhesive bonding.

Optionally, the method includes providing one or more external surfaces of the outer container and the lid to have a wipe-clean surface coating.

Optionally, the method includes fabricating the inner container from a porous material that, in operation, absorbs liquid spills or oozing from the at least one cosmetic product. More optionally, the inner container is fabricated from corrugated cardboard.

Optionally, the method includes manufacturing the lid and the outer container each to include a plurality of mutually cooperating tabs.

Optionally, the inner container is of a rectilinear shape with planar side panels that abut to the planar side panels of the outer container, when the inner container is accommodated within the outer container.

Optionally, planar panels of the inner container completely surround the at least one cosmetic product when the inner container is accommodated within the outer container.

Optionally, the method includes providing one or more surfaces of the planar panels of the outer container with a finish onto which graphical images are susceptible to being printed.

Additional aspects, advantages, features and objects of the present invention would be made apparent from the drawings and the detailed description of the illustrative embodiments construed in conjunction with the appended claims that follow.

It will be appreciated that features of the present invention are susceptible to being combined in various combinations without departing from the scope of the present invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present invention, exemplary constructions of the invention are shown in the drawings. However, the present invention is not limited to specific methods and instrumentalities disclosed herein. Moreover, those in the art will understand that the drawings are not to scale. Wherever possible, like elements have been indicated by identical numbers.

Embodiments of the present invention will now be described, by way of example only, with reference to the following diagrams wherein.

Figure 1:
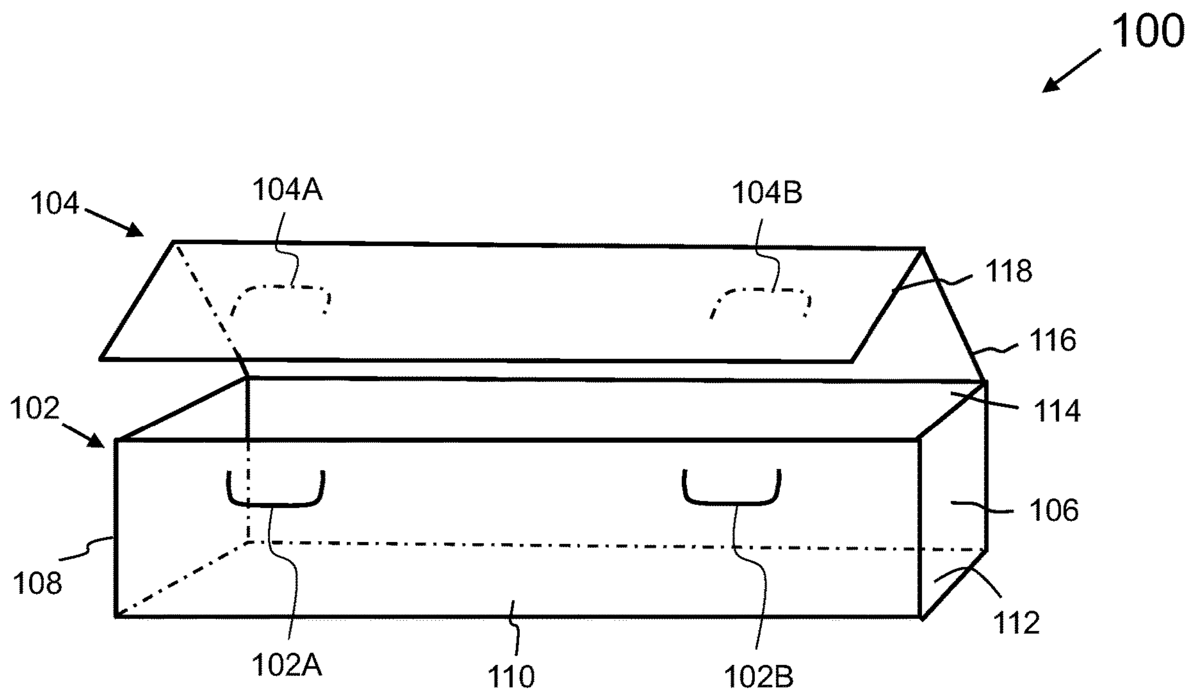
FIG. 1 is a schematic illustration of a front perspective view of a cosmetic-product packaging in a partly open state, in accordance with an embodiment of the present invention.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present invention and ways in which they can be implemented. Although some modes of carrying out the present invention have been disclosed, those skilled in the art would recognize that other embodiments for carrying out or practising the present invention are also possible.

In one aspect, there is provided a cosmetic-product packaging, characterized in that the cosmetic-product packaging includes:

(i) an outer container having a plurality of planar side panels, and a lid that is pivotally coupled to the outer container, characterized in that the outer container and the lid are provided with at least one container projecting tab and at least one lid projecting tab respectively, characterized in that a distal end of the at least one lid projecting tab clips onto a distal end of the at least one container projecting tab to secure the lid in a closed position to the outer container;

(ii) an inner container that is mountable within the outer container, characterized in that, in operation, the inner container accommodates at least one cosmetic product, and the inner container is accommodated within the outer container; and (iii) the inner container is user-accessible when the lid is in an open position, characterized in that the distal ends of the projecting tabs are spatially mutually separated, for accessing the at least one cosmetic product wherein the inner container comprises customizable holding tabs to ensure a snug fit of the at least one cosmetic product therein, and wherein at least one of the planar side panels of the outer container is arranged to be reflective for use in application of the one or more cosmetic products.

By “snug” is meant, for example, a clearance of less than 3 mm around the at least one cosmetic product, more optionally a clearance of less than 0.5 mm around the at least one cosmetic product; such a clearance allows convenient user access to the at least one cosmetic product without needing to apply undue force, but allows the at least one cosmetic product to be retained in position without rattle about during transit.

In another aspect, there is provided a method of (namely, a method for) manufacturing a cosmetic-product packaging, characterized in that the method includes:

(i) fabricating an outer container having a plurality of planar side panels, and a lid that is pivotally coupled to the outer container, and providing the outer container and the lid with at least one container projecting tab and at least one lid projecting tab respectively, characterized in that a distal end of the at least one lid projecting tab clips onto a distal end of the at least one container projecting tab to secure the lid in a closed position to the outer container;

(ii) fabricating an inner container that is mountable within the outer container, characterized in that, in operation, the inner container accommodates at least one cosmetic product, and the inner container is accommodated within the outer container;

(iii) arranging for the inner container to be user-accessible when the lid is in an open position, characterized in that the distal ends of the projecting tabs are spatially mutually separated, for accessing the at least one cosmetic product;

(iv) arranging for the inner container to comprise customizable holding tabs to ensure a snug fit of the at least one cosmetic product therein; and (v) arranging for at least one of the planar side panels of the outer container to be reflective for use in application of the one or more cosmetic products.

The present invention provides the aforementioned cosmetic-product packaging and the aforementioned method of (namely, a method for) manufacturing the cosmetic-product packaging. Beneficially, the cosmetic-product packaging stores at least one cosmetic product. The cosmetic-product packaging disclosed herein is, more attractive, more durable, and user-friendly. Moreover, the user-friendly cosmetic-product packaging is easily accessible for opening and closing multiple times, thereby enhancing longevity of use of the cosmetic-product packaging, for example, for reuse purpose or alternative uses. Moreover, such user-friendly closure mechanism enhances the usability of the cosmetic-product packaging by, for example, elderly people with finger dexterity problems. Additionally, such user-friendly closure mechanism provides reliable closure, easy repairing, and is very cost-effective in manufacturing.

Additionally, beneficially, the cosmetic-product packaging comprises the inner container, specifically, the customizable holding tabs ensure a snug fit of the at least one cosmetic product therein, that provides an enhanced shock protection to the at least one cosmetic product stored therein. Specifically, the customizable holding tabs ensure a snug fit of the at least one cosmetic product thereby eliminating substantial waste originating from cushioning elements used to protect the cosmetic product in transit. Notably, the inner container substantially reduces a possibility of accidental damage to the at least one cosmetic product therein in an event that the outer container is subject to knocks and/or impact forces during transportation or usage by the user. Furthermore, the inner container is formed of environmental-friendly, namely, reusable and recyclable, material, such as a paper- and/or cardboard-sheet and absorbs spills, leaks or oozing from the at least one cosmetic product. The inner container thereby protects the outer container from discoloration, softening or similar degradation due to liquids exposure from leakage or oozing from the at least one cosmetic product. Furthermore, the inner container is easily removed and replaced in an event that it is degraded in use due to leakage or oozing from the at least one cosmetic product. Moreover, all the components of the cosmetic-product packaging are assembled together by an automated machinery in view of its simple design (namely, folded manner of construction). Furthermore, the cosmetic-product packaging is easily disassembled in an event that one or more components thereof are to be recycled. It will be appreciated that, optionally, the cosmetic-product packaging is aesthetically appealing to users. Moreover, the cosmetic-product packaging provides a use to the user of the cosmetic-product by acting as a mirror for application of the cosmetic product, thereby ensuring that the user does not discard the packaging. Furthermore, as one of the planar side panels is manufactured to be reflective instead of incorporating a mirror into the packaging, the packaging is not bulky and is economical.

Throughout the present invention, the term “cosmetic product” as used herein refers to a nature- and/or synthetic- (namely, chemical) based product for beautification and/or skincare used for one or more parts of a human body. Generally, the use of at least one cosmetic product is by means of an ectopic application thereof on the skin of the different parts of the human body, hair or nails. The at least one cosmetic product includes, but is not limited to, an eye liner, a mascara, a kohl, an eye shadow, a skin blush, a base makeup (comprising a foundation, a contouring crème, compact powder, talcum powder and so forth), a lipstick, a nail paint, a hand crème, a facial kit (comprising a face cleanser, a face scrub, a massaging crème and/or gel, a toner, an astringent, a face mask and so forth), a make blending sponge, a make-up brush, a hair tonic and/or serum, a skincare essential, and the like. Typically, the at least one cosmetic product comprises a body, which is in the form of a bottle, a sachet, a tube, a stick, a box container and so forth. The body of the at least one cosmetic product is formed of a plastic material, a wooden material, a glass, fiber, or any other suitable material. Furthermore, throughout the present invention, the term “cosmetic-product packaging” as used herein refers to an external packaging containing one or more cosmetic products. Generally, the at least one cosmetic product is provided to a potential user of the cosmetic product, by a manufacturer of the cosmetic product, by arranging (namely, placing) the at least one cosmetic product within the cosmetic-product packaging for the purpose of transport, presentation for sale and eventual assistance with use of the cosmetic products by users. It will be appreciated that a shape, size and form of the cosmetic-product packaging is chosen according to a shape, size and form of the cosmetic product therein. Typically, the cosmetic-product packaging has a three-dimensional (3D) geometrical shape, for example, such as a cylindrical shape, a cuboidal shape, a cubical shape, a pentagonal shape, a hexagonal shape, a prism shape, a pyramid shape, a sphere shape, or any other polygonal shape, of varying size and volume depending upon the content (namely, cosmetic product) therein. The cosmetic-product packaging is designed to be opened and closed for accessing, using, and storing the at least one cosmetic product therein. In addition, the cosmetic-product packaging is fabricated from at least one material, such as a plastics material, a paper-based material, a wood-based material, a glass, a fiber and the like. Moreover, the texture of the at least one material used for fabricating the cosmetic-product packaging can be substantially rough, smooth, or any combination thereof, for example, some portions of the cosmetic-product packaging may be rough, such that useful for providing a goof grip over the cosmetic-product packaging; some portions of the cosmetic-product packaging may be smooth, such that for printing graphics on the exterior of cosmetic-product packaging; and some portions of the cosmetic-product packaging may be a combination of rough and smooth, such that for making the cosmetic-product packaging appear more appealing to the user. For example, by "smooth" is meant a surface undulation of less than 0.05 mm to 0.25 mm, and preferably, 0.08 mm to 0.15 mm. Moreover, by "rough" is meant a surface undulation of more than 0.05 mm to 0.25 mm, and preferably, 0.08 mm to 0.15 mm. In addition, a finish of the cosmetic-product packaging could be uncoated, glossy, matte, and the like. Beneficially, the cosmetic-product packaging provides protection to the at least one cosmetic product therein. Notably, the cosmetic-product packaging protects the cosmetic product from any damage caused by physical impacts (for example, such as falls, crushing, rough handling, friction with surfaces or other objects, and the like), shocks, knocks and any other accidental factors (such as heat damage, spillage damage, and the like).

The cosmetic-product packaging includes the outer container having a plurality of planar side panels. In particular, the plurality of planar side panels form the outer sides of the outer container. Notably, the outer container provides a definite shape and structure to the cosmetic-product packaging. Optionally, the outer container is designed in a manner that the dimensions of the outer container are greater than dimensions of the at least one cosmetic product stored therein. Beneficially, the outer container serves as an outermost element of the cosmetic-product packaging that is exposed to the environment, whilst securing the at least one cosmetic product therein and therefore, provides protection to the at least one cosmetic product. Additionally, the outer container generally provides an aesthetic appeal to the cosmetic-product packaging.

The cosmetic-product packaging includes the lid that is pivotally coupled to the outer container. The lid extends from an edge of the outer container in a manner that the lid is pivotally coupled to the outer container. In particular, the lid can be pivotally moved to cover an open side of the outer container for completely enclosing the at least one cosmetic product within the cosmetic-product packaging. Moreover, the pivotal coupling between the outer container and the lid allows for turning of the lid along the edge of the outer container and the lid in order to close or open the cosmetic-product packaging. Notably, the lid serves as a covering of the cosmetic-product packaging that, when not in operation, allows an access to the at least one cosmetic product stored within the cosmetic-product packaging.

In an embodiment, the lid is pivotally coupled to the outer container along an entire length of a given edge of the outer container. In another embodiment, the lid is pivotally coupled to the outer container, having two adjacent open sides, along an entire length of a given side of the outer container. In such a case, the lid can be pivotally coupled to the outer container along an entire length of a given edge of the outer container, such that the contents of the cosmetic-product packaging can be accessible from the two adjacent sides of the cosmetic-product packaging. In yet another embodiment, the lid is pivotally coupled to the outer container along only a portion of an entire length of the given edge of the outer container. In such a case, the lid can be pivotally coupled to the outer container along only a central portion or a side portion of the entire length of the given edge of the outer container.

The outer container and the lid are provided with the container projecting tab and the lid projecting tab, respectively. Notably, the container projecting tab is positioned on an external surface of the outer container and the lid projecting tab is positioned on an internal surface of the lid in a manner that the container projecting tab and lid projecting tabs are accessible to the user. Notably, the container projecting tab and lid projecting tabs are provided for purposes of closing and opening the cosmetic-product packaging. The container projecting tab and the lid projecting tab are three dimensional structures, that can have a polygonal shape, a circular shape, an elliptical shape, an abstract shape, or any other specific shape. Optionally, the projecting tabs optionally have a lateral width in a range of 1.5 mm to 5 cm, more optionally in a range of 5 mm to 2 cm. Moreover, optionally, the projecting tabs have a projecting length in a range of 1.5 mm to 2 cm, more optionally in a range of 3 mm to 1 cm. Furthermore, the projecting tabs have an out-of-plane projection when formed (or inserted, if provided by way of plastics-material inserts) in a range of 1.5 mm to 5 mm.

For sake of simplicity and clarity, "the container projecting tab and the lid projecting tab" are, sometimes, collectively referred to as one of "the projecting tabs," "the container and lid projecting tabs" or, simply, "the tabs" throughout the description.

Optionally, the lid and the outer container each include a plurality of mutually cooperating tabs. More optionally, a plurality of mutually cooperating tabs provide a secured cosmetic-product packaging and provides protection to the cosmetic products therein. Furthermore, the at least one container projecting tab and the at least one lid projecting tab, comprises a distal end and a proximal end, wherein the distal end of the container projecting tab and the distal end of the lid projecting tab are located away from the outer container and the lid respectively, while the proximal end of the at least one container projecting tab and the proximal end of the at least one lid projecting tab are located on the bases of the outer container and the lid respectively.

The distal end of the at least one lid projecting tab clips onto the distal end of the at least one container projecting tab to secure the lid in a closed position to the outer container. Notably, the distal end of the at least one lid projecting tab and the distal end of the at least one container projecting tab act as a projecting part of the at least one lid projecting tab and the at least one container projecting tab. Specifically, the tabs mutually cooperate at engaging elastically at their distal ends for repetitive disengagement of the lid from the outer container. Beneficially, such mutually cooperating tabs attach, by means of clipping, at their distal ends for securing the cosmetic-product packaging and provides protection to the cosmetic products therein. For this purpose, the distal ends of the tabs make an angle of projection with respect to their respective bases, namely, the lid and the outer container respectively, could be in a range of 30° to 60°, more preferably 30° to 45°. More specifically, the distal ends of the tabs can be projecting collars, ribs, rims, and the like. Furthermore, specifically, the distal ends of the tabs could have a polygonal shape, a circular shape, an elliptical shape, an abstract shape, or any other specific shape.

In use, the clipping of the tabs by the user secures the lid in the closed position to the outer container. Specifically, the clipping of the tabs is mediated by the retention of each of the tabs by a slot created between the base of the container and the lid and the corresponding projecting tab protruding therefrom. In such a closed position, the at least one cosmetic product is prevented from falling out of the cosmetic-product packaging or being accessed by the user. Furthermore, in use, the clipped tabs can also be unclipped by the user thereby opening the tabs to pivot the lid away from the outer container into the open position. In the open position, the at least one cosmetic product can be accessed by the user.

Optionally, the tabs are integral to the outer container and the lid, and are formed by cutting into a material of the outer container and the lid. Notably the tabs are carved out of the outer container and the lid. Specifically, carving out the tabs includes cutting into the material of the outer container and the lid. More specifically, the cutting into the material of the outer container and the lid could be achieved by using a knife, a blade, a pair of scissors, a machine, such as a laser, a 3D cutter, or any other manner known in the art. Moreover, the cuts are made in such a manner that the cuts could house the projecting tabs. The tabs are cut out of the material of the outer container and the lid made of paper- or cardboard-containing materials, plastic material, metallic material and the like. It will be appreciated that the tabs could be formed from folding the cut-outs of the material of the outer container and the lid.

Optionally, the tabs are formed by using plastics material inserts that are applied to the outer container and the lid during manufacturing thereof. Alternatively, the tabs formed by using plastic material and/or metal may be applied, by way of insertion, into the outer container and the lid at the manufacturing stage of the cosmetic-product packaging. Beneficially, the plastic material inserts enable better securing of the cosmetic-product packaging, attributed to the substantial static friction therebetween.

Optionally, the at least one container projecting tab and the at least one lid projecting tab are mutually identical. In such as case, a shape, size and/or angle of projection of the tabs is substantially mutually identical; for example, by "substantially" is meant identical to within ±10% in physical dimensions, more optionally to within ±5% in physical dimensions; and the angle of projection is identical to within ±10° in the angle of projection, more optionally to within ±5° in the angle of projection. Alternatively, optionally, the at least one container projecting tab and the at least one lid projecting tab are non-identical. In such a case, the shape, the size and/or the angle of the tabs are mutually different; for example, by "different" is meant more than ±5% different from each other in physical dimensions, more optionally more than ±10% different from each other in physical dimensions; and the angle of projection to within ±5° in the angle of projection, more optionally to within ±10° in the angle of projection. In an example, the dimensions of the tabs are mutually equal. For example, a lateral width of the tabs may be equal to 14 mm and a length of the tabs may be 6 mm. In another example, the dimensions of the tabs are mutually unequal. For example, the dimension of the container projecting tab may have a lateral width equal to 14 mm and a length of 6 mm; and the dimension of the lid projecting tab may have a lateral width equal to 13.5 mm and a length of 5.5 mm. Ranges for dimensions of the tabs are provided in the foregoing. It will be appreciated that the cosmetic-product packaging does not employ any adhesives to close the lid and instead uses the projecting tabs for the purpose. Generally, the use of adhesive on a packaging makes the packaging unrecyclable. Therefore, by eliminating the need of an adhesive, the cosmetic-product packaging is fully recyclable.

Furthermore, the cosmetic-product packaging includes the inner container that is mountable within the outer container, wherein, in operation, the inner container accommodates the at least one cosmetic product, and the inner container is accommodated within the outer container. Notably, the inner container has a size which is smaller than that of the outer container, in order to be accommodated within the outer container. The inner container can be positioned within the outer container in a way that the inner container is substantially surrounded by the outer container. It will be appreciated that the size of the inner container is greater than a size of the at least one cosmetic product to be accommodated therein, in order to provide adequate room for the at least one cosmetic product within the cosmetic-product packaging.

The inner container is user-accessible when the lid is in the open position, wherein the distal ends of the projecting tabs are spatially mutually separated, for accessing the at least one cosmetic product. When the distal ends of the projecting tabs are spatially mutually separated, the lid can be pivotally turned away from the outer container in a manner that the inner container becomes accessible to the user. In simpler terms, the lid can be understood to act as the covering which, in the closed position, makes the inner container inaccessible to the user, and in the open position, makes the inner container accessible to the user. Notably, the inner container cannot be accessed without pivotally moving the lid away from the outer container leading to the open position. In other words, when the lid is secured in the closed position to the outer container, the inner container which is placed within the outer container becomes inaccessible to the user.

Optionally, the outer container and inner container are fabricated from paper- or cardboard-containing materials. Notably, the paper- or cardboard-containing materials are lightweight, easy to handle and inexpensive. Beneficially, such paper or cardboard-containing materials can be easily reused and/or recycled and are therefore extremely environment friendly. Optionally, the outer container and/or the inner container are fabricated from a combination of the paper- or cardboard-containing materials. Alternatively, optionally, the outer container and the inner container are fabricated from plastics material sheet or film, metallic material sheet or film, or a combination of two or more of paper-containing materials, cardboard-containing materials, plastic materials and metallic materials; optionally, plastics materials that are employed are biodegradable, for example in an event of the cosmetic-product packaging being discarded into the environment, for example into land-fill sites or into aquatic environments; more optionally, such biodegradable plastics materials includes using polylactic polymers.

Optionally, the inner container is fabricated from a porous material that, in operation, absorbs liquid spills or oozing from the at least one cosmetic product. Generally, the body of the at least one cosmetic product contains the at least one cosmetic product therein to avoid any undesirable spillage. However, in a scenario of spillage or oozing of the at least one cosmetic product, such an absorbent inner container comes in handy to protect the outer container from discoloration, softening due to liquids exposure or similar resulting from leakage or oozing from the at least one cosmetic product. Notably, the porous material used in fabricating the inner container is a cellulosic- or a fiber-based product, such as tissue paper, cotton, sponge, fluff pulp, cardboard and the like. More optionally, the inner container is fabricated from corrugated cardboard. Notably, the corrugated cardboard is a corrugated sheet of stiff paper lined by one or more linerboards. Beneficially, the corrugated cardboard has higher absorbency and strength as compared to regular cardboards and paper. Therefore, the inner container fabricated from corrugated cardboard absorbs undesirable liquid spills or oozing from the at least one product whilst also providing protection from physical damages, such as damage caused by accidental crushing, falling, shock and the like, while during storage and/or transporting of the cosmetic products in the user's handbag, rucksack, bathroom, and so forth.

The inner container comprises customizable holding tabs to ensure a snug fit of the at least one cosmetic product therein. Notably, the holding tabs are customizable to fit different sizes of the at least one cosmetic product therein. It will be appreciated that such customizable holding tabs eliminate any need of cushioning materials (for example, polystyrene foam peanuts) that are required to protect the at least one cosmetic product in transit. Beneficially, the customizable holding tabs significantly reduce environmental waste originating from discarding of such cushioning elements.

Optionally, one or more inner surfaces of the inner container are lined with shock absorbing material to protect the at least one cosmetic product arranged within the inner container. Specifically, the inner container provides additional shock protection to the at least one cosmetic product in an event that the outer container is subject to knocks and impact forces. More optionally, the shock absorbing material include, but are not limited to, foam, cloth, soft plastics materials, gel liners and silicone (for example, biodegradable silicone).

Notably, at least one of the planar side panels is arranged to be reflective for use in application of the one or more cosmetic products. Notably, the at least one planar side panel functions as a mirror to be used for application of the cosmetic products such as lipstick, eye-liner and the like. The at least one planar side panel is coated with a high-reflection coating that reflects the light incident thereupon, thereby acting as a mirror. Examples of high-reflection coatings include, but are not limited to, UV enhanced aluminum, protected silver, protected aluminum. Beneficially, such an extended use of the packaging beyond storing and protecting the cosmetic product reduces a likelihood of the user discarding the packaging and contributing to environment waste. Furthermore, the high-reflection coating does not add any additional weight or substantial cost to the cosmetic-product packaging.

Optionally, the inner container is designed to be easily removed and replaced in an event that it is degraded in use through leaks or oozing of liquids from the at least one cosmetic product.

Optionally, one or more external surfaces of the outer container and the lid have a wipe-clean surface coating. Such one or more external surfaces having the wipe-clean surface coating could be wiped clean by way of dry-cleaning techniques or wet-cleaning techniques. Specifically, in the dry-cleaning techniques, the user may clean the one or more external surfaces of the outer container and the lid using a dry material (such as a dry napkin, a dry tissue, or any other dry-cleaning technique known in the art), whereas in the wet-cleaning techniques, the user may clean the one or more external surfaces of the outer container and the lid using rub a damp material (such as a damp napkin or a damp cloth) or a wet material (such as a cleaning spray). More optionally, the wipe-clean surface coating acts as a water-proof coating to allow for cleaning the one or more external surfaces of the outer container and the lid by way of the wet-cleaning techniques. In an example, the one or more external surfaces of the outer container and the lid can have a wax coating thereon. Beneficially, the wax coating at least partially prevents water drops to be absorbed within such surfaces. In another example, the one or more external surfaces of the outer container and the lid can have a plastics-material coating thereon that allows the user to wipe such surfaces with a wet cleaning material.

Optionally, the outer container has an elongate rectilinear shape, wherein the outer container includes planar end panels at two ends of the outer container, and wherein the lid includes a plurality of planar lid panels that are mutually pivotally attached, wherein a first planar lid panel is pivotally attached along an elongate edge of one of the plurality of planar side panels of the outer container, and wherein a second planar lid panel is provided with the at least one lid projecting tab, and one of the plurality of planar side panels of the outer container is provided with the at least one container projecting tab, such that the second planar lid panel is abutting in operation to at least one of the plurality of planar side panels of the outer container when the lid is in the closed position, and the first planar lid panel prevents access to the inner container when the lid is in the closed position. Optionally, the elongate rectilinear shape is one of: a cubical shape, a cuboidal shape. Optionally, a number of the planar side panels is chosen such that the inner container can be accessed from at least one side of the outer container. Notably, a given planar lid panel is pivotally attached to one or more planar lid panels adjacent thereto. Such pivotal attachment of the plurality of planar lid panels allows for pivotally turning the lid with respect to the outer container in a plane-by-plane manner. Furthermore, for a given planar lid panel that abuts a given planar side panel of the outer container, the elongate length of the given planar lid panel substantially corresponds to the elongate length of the given planar side panel. The first planar lid panel can be turned along the elongate edge (of pivotal attachment between the lid and the outer container) to abut the lid with a planar side panel of the outer container, when the lid is in the closed position. In such a scenario, the first planar lid panel covers an open side of the outer container, thereby preventing access to the inner container. Furthermore, in such a closed position of the lid, the second planar lid panel abuts at least one of the plurality of planar side panels of the outer container. As an example, in the closed position of the lid, the second planar lid panel may abut only one planar side panel from among the plurality of planar side panels of the outer container. The second planar lid panel abuts in operation to at least one of the plurality of planar side panels of the outer container when the lid is in the closed position, in a manner that the lid projecting tab of the second planar lid panel is adjacent to the container projecting tab of the planar side panel of the outer container. Notably, when the lid is in the closed position, the second planar lid panel covers at least one planar side panel from among the plurality of planar side panels of the outer container. It may be appreciated that the planar end panels and the planar side panels of the outer container may be joined or coupled together by using interlocking tongues, rivets, adhesives or any other suitable fasteners know in the art.

Alternatively, optionally, the elongate rectilinear shape is one of: a cylindrical shape, a pyramid shape, a hexagonal prism shape, any other polygonal prism, such as a pentagonal prism, a heptagonal prism, an octagonal prism and so forth, and the like.

Optionally, the tabs are disposed at the center or towards the ends of the cosmetic-product packaging along each side of the elongate length of the outer container and the lid. Specifically, the lid projecting tab is arranged at a center of the second planar lid panel or towards an edge of the second planar lid panel. Similarly, the container projecting tab is arranged at a center of its corresponding planar side panel or towards an edge of its corresponding planar side panel. In an example, the tabs may be disposed within a region that lies at the center, i.e. at a 50% of the cosmetic-product packaging along the elongate length of the outer container and the lid. In another example, both the tabs are disposed at substantially similar distances, however, towards the ends of the elongate length of the outer container and the lid. For example, the container projecting tab is positioned at 5% to 30% from the right end and 5% to 30% from the left end of the elongate length of the outer container and the lid projecting tab is positioned at 5% to 30% on the right end and 5% to 30% on the left end along the elongate length of the lid. In such an example, the container projecting tab and lid projecting tab are positioned at substantially similar distances from the ends along the elongate length of the outer container and the lid. It will be appreciated that such positioning of the container projecting tab and lid projecting tabs allows for securely closing the cosmetic-product packaging from its center as well as ends.

Optionally, the plurality of planar side panels of the outer container surrounds the inner container on three lateral sides thereof. In such an example, the outer container includes three planar side panels, one corresponding to each side of the inner container. As a result, the inner container is completely housed within the outer container and can be accessed from only one open side of the outer container. Beneficially, such a multi-layered structure provided by the outer container surrounding the inner container provides ample protection to the cosmetic product stored within the cosmetic product packaging.

Optionally, the plurality of planar side panels of the outer container fit snugly around the three lateral sides of the inner container. As a result, no adhesive material is required to secure the inner container within the outer container. Alternatively, optionally, at least one planar side panel from among the plurality of planar side panels of the outer container is adhesively secured to a corresponding lateral side of the inner container.

Optionally, the outer container has an elongate length in a range of 5 cm to 20 cm along an elongate axis of the outer container, and a lateral width in a range of 1 cm to 4 cm in a lateral axis of the outer container, wherein the elongate axis is orthogonal to the lateral axis. Notably, the elongate axis runs along a length of the cosmetic-product packaging and the lateral axis of the cosmetic-product runs along a width of the cosmetic-product packaging. Notably, the plurality of planar side panels is arranged along the elongate axis of the outer container whereas the planar end panels are arranged along the lateral axis of the outer container. Therefore, the elongate length of the outer container substantially corresponds to an elongate dimension of the planar side panels of the outer container. Similarly, the lateral width of the outer container substantially corresponds to a lateral dimension of the planar end panels. In an example, the elongate length of the outer container may be, for example, 5, 6, 7, 8, 9, 10, 11, 12, 13, 14, 15, 16, 17, 18, 19 or 20 cm, whereas the lateral width of the outer container may be, for example, 1, 1.5, 2, 2.5, 3, 3.5 or 4 cm.

Notably, the dimensions, namely, size and/or shape, of the container projecting tab and lid projecting tab corresponds to dimensions, namely, size and/or shape, of the tabs made by cutting into the material of the outer container and the lid. It will be appreciated that the dimensions of tabs are selected to be such that the tabs made by cutting into the material of the outer container and the lid are suitable to mutually cooperate with opposing tabs. Furthermore, the dimensions of tabs are selected to be such that the tabs do not obscure a substantial portion of the external surface of the outer container, for example the container projecting tab and lid projecting tabs have an area that is less than 25% of the external surface of the outer container.

Optionally, the tabs have a lateral width in a range of 3 mm to 25 mm, and a length in a range of 3 mm to 10 mm. Notably, the tabs are disposed at the center or towards the ends along the elongate length of the outer container and the lid. Furthermore, the length of the tab runs along the elongate length of the cosmetic-product packaging and the lateral width of the tab runs along the lateral width of the cosmetic-product packaging. It will be appreciated that the lateral width of the tabs is higher than the length of the tabs to enable attachment, namely, clipping, of the of the tabs for securing the cosmetic-product packaging. In an example, the lateral width of the tabs may be, for example, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25 mm, whereas the length of the tabs may be, for example, 3, 3.5, 4, 4.5, 5, 5.5, 6, 6.5, 7, 7.5, 8, 8.5, 9, 9.5 or 10 mm.

Optionally, one or more planar panels of the outer container and the lid are fabricated as multi-layer structures. Notably, fabrication of the one or more planar panels as multi-layer structures relates to manufacturing (namely, producing or creating) the one or more planar panels in a manner wherein multiple layers of material are arranged to form the one or more planar panels. Such multiple layers of a given multi-layered planar panel are fabricated by at least one of: adhesively bonding the multiple layers to one another, folding a single material into the multiple layers, stacking the multiple layers one on top of the other, and the like. Beneficially, such a multi-layer structure of the one or more planar panels of the outer container and the lid provide strength and rigidity to the cosmetic-product packaging. Furthermore, the multi-layer structure also provides protection to the at least one cosmetic product against damages like falling, spilling of water, scratches and the like. In an example, the multi-layer structure of a given planar panel may be fabricated by adhesively bonding in a range of 2 to 6 layers, more optionally 4 layers, of paper and/or plastics-material sheets. In another example, the multi-layer structure of a given planar panel may be fabricated by folding pieces of paper, plastics-material or any other suitable material.

Beneficially, use of a single sheet of a paper- or cardboard-containing material and simple folded manner of construction therefrom enables the manufacturing of the cosmetic-product packaging more easily by automated machinery. Additionally, the simple design of the cosmetic-product packaging enables easy assembling and disassembling of the various component parts of the cosmetic-product packaging, in an event that the at least one component part of the cosmetic-product packaging is to be recycled or replaced.

Optionally, at least one of the planar panels of the outer container and its lid is secured by adhesive bonding. Such adhesively-bonded planar panels of the outer container and the lid are stronger and more rigid as compared to other un-bonded planar panels of the outer container and the lid. Optionally, planar panels of the outer container and the lid that correspond to a bottom side of the cosmetic-product packaging are secured by the adhesive bonding. This would allow the bottom side of the cosmetic product to be able to bear weight of the at least one cosmetic product contained within the cosmetic-product packaging. Optionally, the at least one of the planar panels of the outer container and the lid is secured by way of at least one of: pins, rivets, clamps, and so forth.

Alternatively, optionally, at least one of the planar panels of the outer container and its lid are secured, at least in part, by magnetic bonding.

Optionally, the inner container is of a rectilinear shape with planar side panels that abut to the planar side panels of the outer container, when the inner container is accommodated within the outer container. In this regard, such a rectilinear shape substantially corresponds to the elongate rectilinear shape of the outer container and is optionally one of: a cubical shape, a cuboidal shape, and the like. As a result, optionally, the planar side panels of the inner container are arranged at right angles (namely orthogonal) with respect to each other and the end planar side panels, thereby forming the rectilinear shape of the inner container and abutting the planar side panels of the outer container. Alternatively, optionally, the rectilinear shape is one of: a cylindrical shape, a pyramid shape, a hexagonal prism shape, any other polygonal prism, such as a pentagonal prism, a heptagonal prism, an octagonal prism and so forth, and the like. In such as case, the planar side panels of the inner container are arranged at such angles (namely, acute, orthogonal, obtuse) with respect to each other and the end planar side panels, thereby forming the cylindrical shape, the pyramid shape, the hexagonal prism shape, any other polygonal prism, such as the pentagonal prism, the heptagonal prism, the octagonal prism and so forth, and the like.

Notably, a number of planar side panels of the inner container is selected such that one side of the inner container is open to allow the user to access the at least one cosmetic product. Specifically, the planar side panels of the inner container form a storage compartment for accommodating the at least one cosmetic product therein. It will be appreciated that the open side of the inner container is covered by the lid (specifically, the first planar lid panel), when the lid is in the closed position.

Optionally, the planar side panels of the inner container completely surround the at least one cosmetic product when the inner container is accommodated within the outer container. The inner container is designed in a way to accommodate fully the at least one cosmetic product within a three-dimensional space between the planar side panels of the inner container. As a result, no part of the body of the at least one cosmetic product lies outside of the inner container and is carefully protected within the cosmetic-product packaging.

Optionally, one of the planar side panels is arranged to have a compartment thereon for holding one or more disposable wipes. It will be appreciated that often wipes are required for removing or correcting an application of the cosmetic product. Therefore, one or more disposable wipes can be held in the compartment for providing convenient access to the user. In an embodiment, the one or more disposable wipes are provided with the cosmetic-product packaging. Beneficially, such a compartment further extends use of the cosmetic-product packaging. It will be appreciated that the compartment may be used to hold articles other than the one or more disposable wipes.

Optionally, at least one of the plurality of planar side panels are fabricated from at least one flexible plastics material that transmits electromagnetic radiation in a wavelength range to which a human eye responds but attenuates radiation in an ultra violet (UV) electromagnetic wavelength range. Specifically, the at least one flexible plastics material is subject to electromagnetic radiations incident thereupon in different ranges of the electromagnetic spectrum. More specifically, the at least one flexible plastics material allows electromagnetic radiations (incident thereupon) in visible wavelength range of the electromagnetic spectrum to pass therethrough. However, the at least one flexible plastics material either absorbs or reflects electromagnetic radiation (incident thereupon) in the ultra violet (UV) wavelength range of the electromagnetic spectrum. Beneficially, the at least one flexible plastics material protects (namely, shields) the one or more products present in the second compartment from electromagnetic radiation in ultra violet electromagnetic wavelength range and prevents damage of the one or more cosmetic products.

Optionally, one of the plurality of planar side panels is arranged to comprise an elastic strap configured to secure one or more objects therein. Notably, the elastic strap is manufactured using an elastic material to snugly hold one or more objects therein. The one or more objects maybe a make-up brush, a blending sponge, another cosmetic product and the like. Moreover, the elastic strap may be used to hang the cosmetic-product packaging onto a hook or to secure to a handbag.

Optionally, the inner container comprises at least one internal dividing panel arranged to divide a space within the inner container in a manner that two or more cosmetic products are accommodated within the inner container. Optionally, a size of the at least one internal dividing panel is selected based upon sizes of the two or more cosmetics products that are to be accommodated within the inner container. Optionally, an arrangement of the at least one internal dividing panel within the inner container is based upon a desired arrangement of the two or more cosmetic products. In an example, the inner container may be divided by way of one internal dividing panel into two compartments along an elongate axis of the inner container. In such an example, two cosmetic products may be housed within the inner container wherein such cosmetic products are in a tubular form or in a form of sticks. In another example, the inner container may be divided by way of two internal dividing panels, one internal dividing panel being arranged along the elongate axis of the inner container and another internal dividing panel being arranged along a lateral axis of the inner container. In such an example, four cosmetic products may be arranged within the inner container, such cosmetic products being in a form of small bottles: by "small" is meant having a cross-section diameter of less than 2 cm, more optionally less than 1 cm.

Optionally, one or more surfaces of the planar panels of the outer container are provided with a finish onto which graphical images are susceptible to being printed. In such a case, one or more internal surfaces and/or external surfaces, for example a plurality of such surfaces, of the one or more surfaces of the planer panels of the outer container are provided with the finish. Such a finish could be a glossy finish, a matte finish, and the like. Notably, printing the graphical images on the one or more surfaces of the planar panels of the outer container allows for enhancing a visual appearance of the cosmetic-product packaging. Furthermore, such graphical images can also be employed to convey information to potential buyers and users of the at least one cosmetic product enclosed within the cosmetic-product packaging; for example, the information pertains to instructions regarding a manner of use of the at least one cosmetic product (for example, allergy information). Examples of such graphic images include, but are not limited to, a brand name of the manufacturer of the at least one cosmetic product, a logo of the manufacturer of the at least one cosmetic product, a shade of the at least one cosmetic product, a collection to which the at least one cosmetic product belongs, a price of the at least one cosmetics product, an expiry date of the at least one cosmetic product, directions for use of the at least one cosmetics product, an image, an abstract design, a pattern, text, and numeric characters. In an example, all outer surfaces of the planar panels of the outer container may be provided with a glossy finish and the brand name of the manufacturer of the at least one cosmetic product and the shade of the at least one cosmetics product may be printed onto such outer surfaces.

The present invention also relates to the method as described above. Various embodiments and variants disclosed above apply mutatis mutandis to the method.

Optionally, the method includes fabricating the outer container and inner container from paper- or cardboard-containing materials.

More optionally, the outer container has an elongate rectilinear shape, wherein the outer container includes planar end panels at two ends of the outer container, and a plurality of planar side panels on sides of the outer container, and wherein the lid includes a plurality of planar lid panels that are mutually pivotally attached, wherein a first planar lid panel is pivotally attached along an elongate edge of one of the plurality of planar side panels of the outer container, and wherein a second planar lid panel is provided with the at least one lid projecting tab, and one of the plurality of planar side panels of the outer container is provided with the at least one container projecting tab, such that the second planar lid panel is abutting in operation to at least one of the plurality of planar side panels of the outer container when the lid is in the closed position, and the first planar lid panel prevents access to the inner container when the lid is in the closed position.

Furthermore, optionally, the method includes arranging for the plurality of planar side panels of the outer container to surround the inner container on three lateral sides thereof.

Optionally, the outer container has an elongate length in a range of 5 cm to 20 cm along an elongate axis of the outer container, and a lateral width in a range of 1 cm to 4 cm in a lateral axis of the outer container, wherein the elongate axis is orthogonal to the lateral axis.

More optionally, the tabs have a lateral width in a range of 3 mm to 25 mm, and a length in a range of 3 mm to 10 mm.

Furthermore, optionally, the tabs are integral to the outer container and the lid, and are formed by cutting into a material of the outer container and the lid.

Yet, more optionally, the tabs are formed by using plastic material inserts that are applied to the outer container and the lid during manufacturing thereof.

Optionally, the one or more planar panels of the outer container and the lid are fabricated as multi-layer structures.

More optionally, the at least one of the planar panels of the outer container and its lid is secured by adhesive bonding.

Furthermore, the method includes providing one or more external surfaces of the outer container and the lid to have a wipe-clean surface coating.

Optionally, the method includes fabricating the inner container from a porous material that, in operation, absorbs liquid spills or oozing from the at least one cosmetic product. More optionally, the inner container is fabricated from corrugated cardboard.

Furthermore, optionally, the inner container is of a rectilinear shape with planar side panels that abut to the planar side panels of the outer container, when the inner container is accommodated within the outer container.

Optionally, the method includes manufacturing the lid and the outer container each to include a plurality of mutually cooperating tabs.

Optionally, the planar panels of the inner container completely surround the at least one cosmetic product when the inner container is accommodated within the outer container.

Optionally, the method includes providing one or more surfaces of the planar panels of the outer container with a finish onto which graphical images are susceptible to being printed.

In an exemplary implementation, the outer container is fabricated from a single sheet of material, such as paper-containing, cardboard-containing, plastics material, metallic or combination thereof. Such material is folded to generate a rectilinear shape having a plurality of planar side panels and two planar end panels. The single sheet used for fabricating the outer container comprises projecting flap of the single sheet of card that is folded back and held in position together via use of a lid rivet, a magnet, an adhesive, and so forth, to provide a lid having two planar panels, namely the first planar lid panel and the second planar lid panel. Furthermore, the distal planar panel is provided with a tab. More optionally, the planar end panels of the cosmetic-product packaging are formed by interlocking tongues that meet midway at the two planar end panels.

DESCRIPTION OF DRAWINGS

Referring to FIG. 1, there is shown a schematic illustration of a front perspective view of a cosmetic-product packaging 100 in a partly open state, in accordance with an embodiment of the present invention. The cosmetic-product packaging 100 includes an outer container 102 having a plurality of planar side panels 110, 112, 114, and a lid 104 that is pivotally coupled to the outer container 102. As illustrated, the outer container 102 includes planar end panels 106 and 108 at two ends of the outer container 102, and the plurality of planar side panels 110, 112 and 114 on sides of the outer container 102. Furthermore, the lid 104 includes a plurality of planar lid panels, namely a first planar lid panel 116 and a second planar lid panel 118 that are mutually pivotally attached. Specifically, the first planar lid panel 116 is pivotally attached along an elongate edge of one of the plurality of planar side panels of the outer container 114, and the second planar lid panel 118 is pivotally coupled to the first planar lid panel 116, such that the second planar lid panel 118 is abutting in operation to at least one of the plurality of planar side panels, such as the planar side panel 110, of the outer container 102 when the lid 104 is in the closed position. Thereby, the first planar lid panel 116 prevents access to an inner container (shown in FIG. 3), by way of closing, in operation, an at least one open side, such as a top side, corresponding to an optional lid (shown in FIG. 3) of the inner container, of the outer container 102, when the lid 104 is in the closed position.

Furthermore, as illustrated, the outer container 102 and the lid 104 are provided with at least one container projecting tab, such as container projecting tabs 102A and 102B and at least one lid projecting tab, such as lid projecting tabs 104A and 104B. Specifically, one of the plurality of planar side panels, such as the planar side panel 110, of the outer container 102, is provided with two container projecting tabs 102A and 102B, and the second planar lid panel 118, of the lid 104, is provided with two lid projecting tabs 104A and 104B. As will be discussed later, a distal end of the at least one lid projecting tab 104A and 104B clips onto a distal end of the at least one container projecting tab 102A and 102B to secure the lid 104 in a closed position to the outer container 102.

In one example, the at least one container projecting tab 102A and 102B and at least one lid projecting tab 104A and 104B are integral to the outer container 102 and the lid 104, and are formed by cutting into a material of the outer container 102 and the lid 104 respectively, and then performing a bending or shaping operation to render the at least one container projecting tab 102A and 102B to be projecting out-of-plane. Notably, the cutting into a material of the outer container 102 and the lid 104 respectively results in formation of slots for tabs, such as tab slots 110A and 110B (not shown here, however, can be seen in FIG. 3), and 118A (not shown here, however, can be seen in FIG. 5C or FIG. 6B). It will be appreciated that there will a corresponding tab slot for the lid projecting tab 104B which is not visible in the accompanying drawings. Furthermore, it will be appreciated that the tab slots may not be visible under the corresponding container projecting tabs 102A and 102B, and the lid projecting tabs 104A and 104B, respectively, when viewed from front or top, and optionally in one or more of perspective views as shown in the accompanying drawings. In an alternative example, the at least one container projecting tab 102A and 102B and the at least one lid projecting tab 104A and 104B are formed by using plastics material inserts that are applied, by adhesives, push-fit (using barbs for retention) or the like, while manufacturing to the outer container 102 and the lid 104.

The inner container comprises customizable holding tabs to ensure a snug fit of the at least one cosmetic product therein. Furthermore, at least one the plurality of planar side panels, for example the planar side panel 114 of the outer container 102 is arranged to be reflective for use in application of the one or more cosmetic products.

Figure 2A:
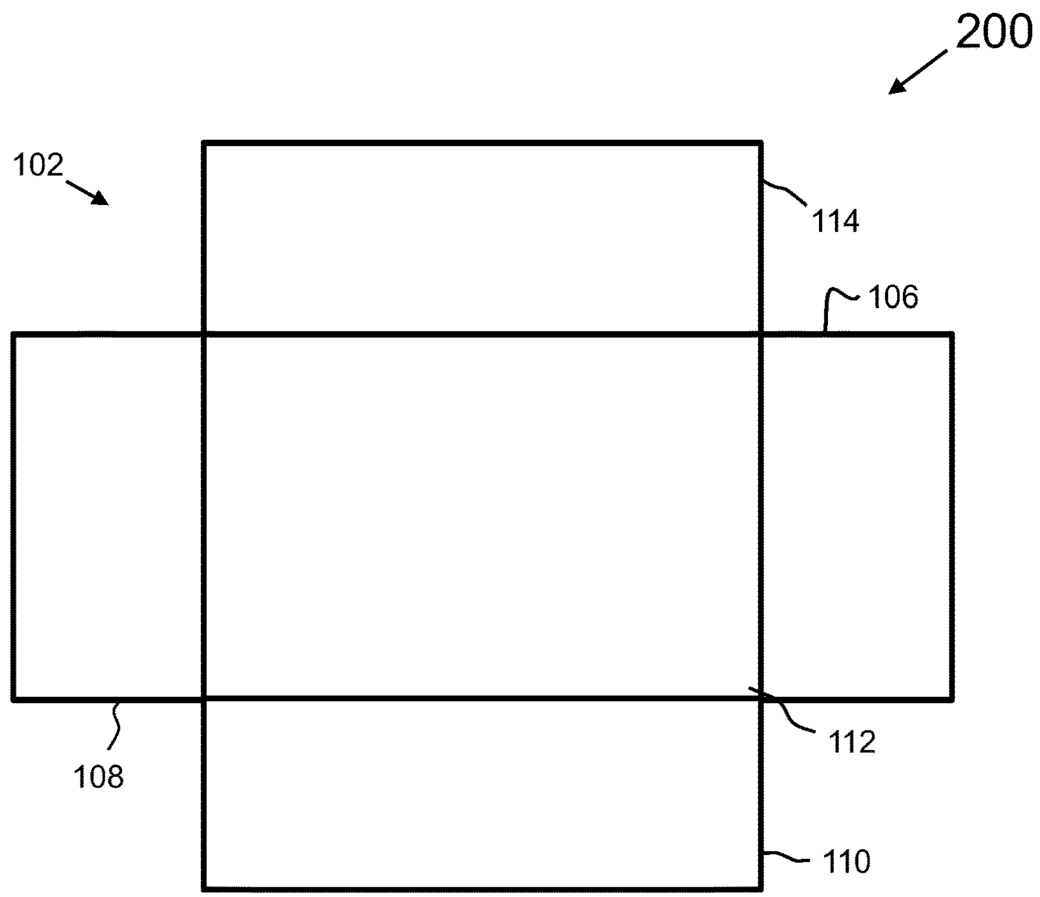
FIGS. 2A, 2B and 2C are schematic illustrations of a single sheet of paper- or cardboard-containing material for completely or partially manufacturing a cosmetic-product packaging, in accordance with an embodiment of the present invention.
Figure 2B:
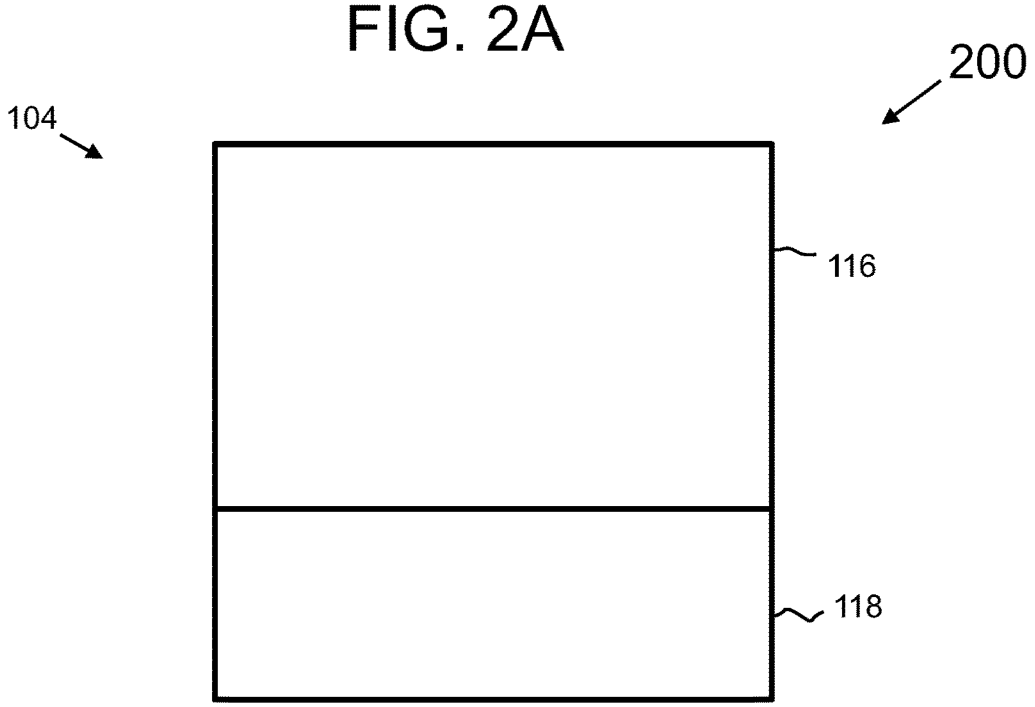
Figure 2C:
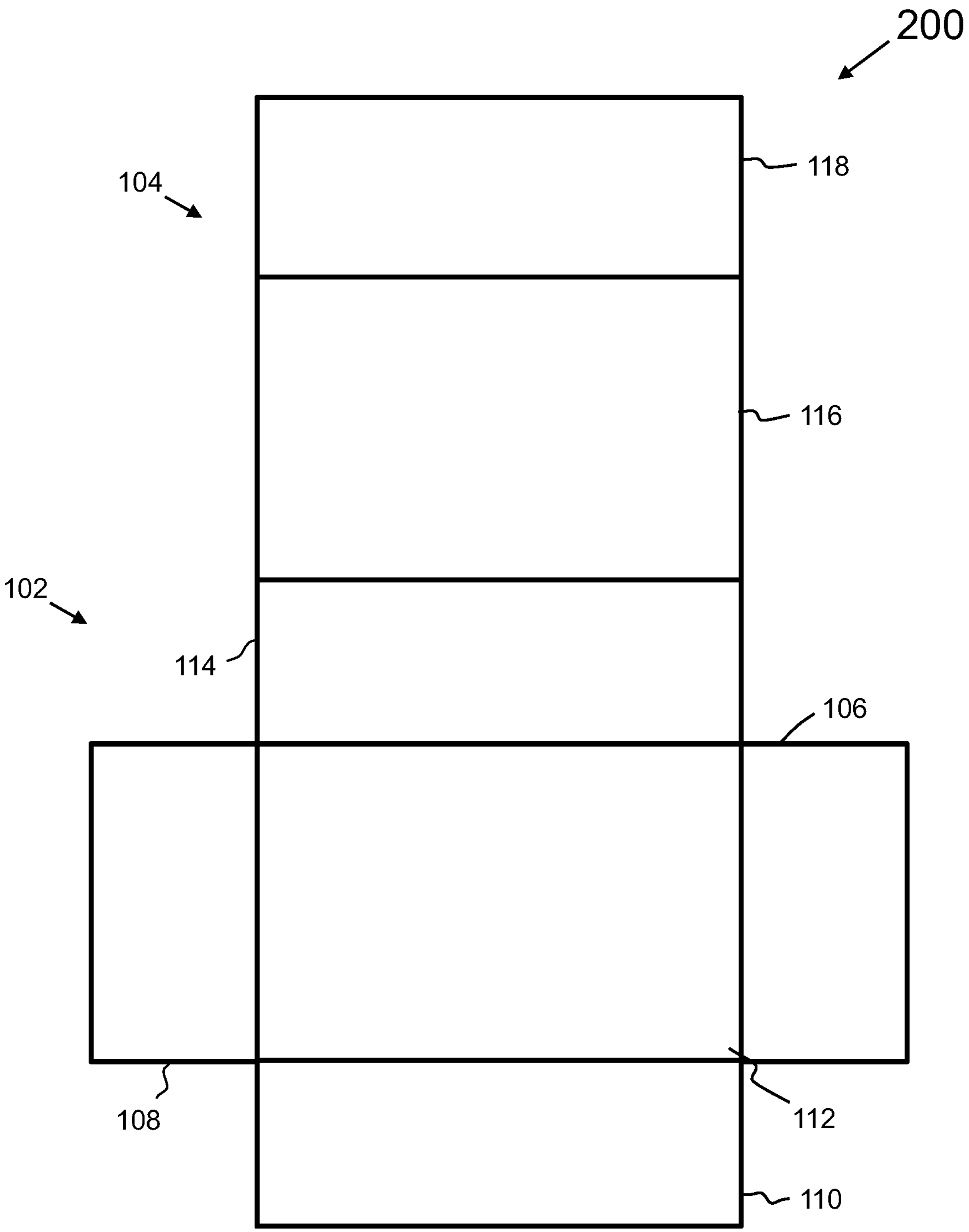
Figure 3:
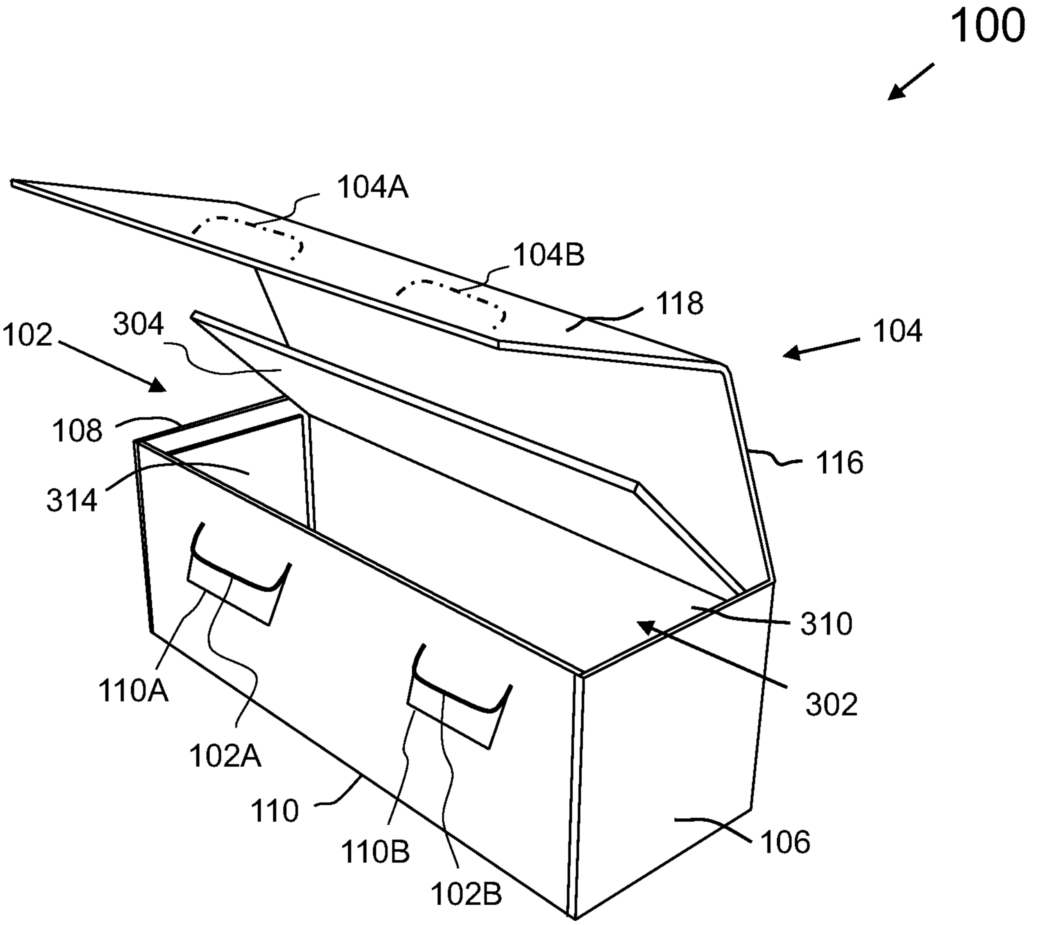
FIG. 3 is a schematic illustration of a side perspective view of a cosmetic-product packaging in an open state, in accordance with an embodiment of the present invention.

In each of FIGS. 2A, 2B and 2C, different shapes and sizes of single sheet 200 of paper or cardboard material are shown which can be folded in different manners to form the outer container 102, the lid 104 and/or an assembly of the outer container 102 and the lid 104. It may be contemplated that, optionally, the lid 104 (as shown in FIG. 1) and, furthermore, the inner container (as shown in FIG. 3) may also be fabricated from a single sheet (not shown) of paper or cardboard materials. The single sheet 200 of paper or cardboard material is folded at predefined portions and angles (as may be seen from FIGS. 2A, 2B and 2C) to form the outer container 102 with a rectilinear shape having planar side panels 110, 112 and 114, and, furthermore, the lid 104 with two planar lid panels, i.e. a first planar lid panel 116 and a second planar lid panel 118. It may be appreciated that the tabs 102A and 102B, and 104A and 104B are formed by cutting out a portion from one of the planar side panel of the container, such as 110, and the second planar lid panel 118, respectively.

Figure 4:
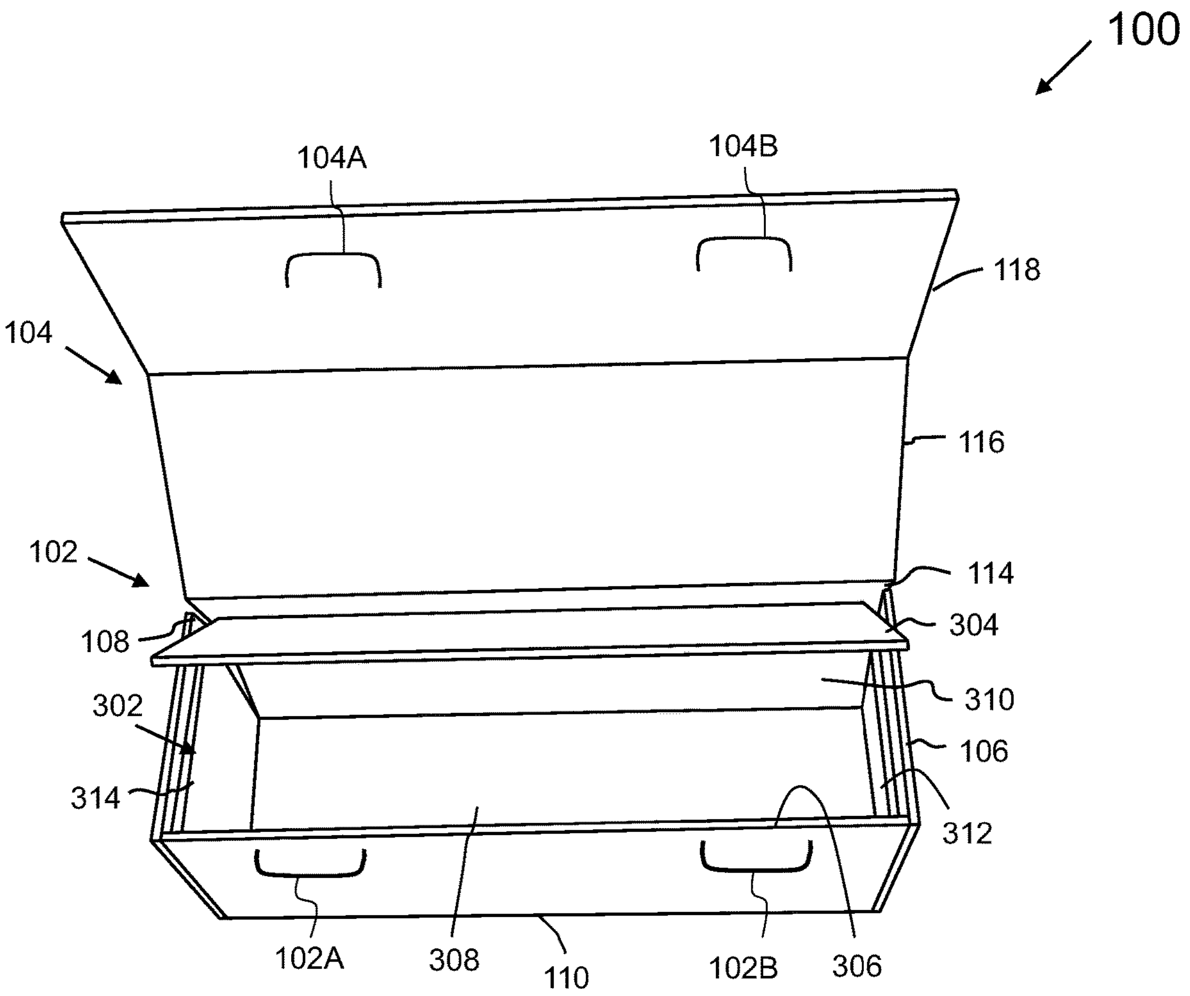
FIG. 4 is a schematic illustration of a top perspective view of a cosmetic-product packaging in an open state, in accordance with an embodiment of the present invention.

Referring to FIGS. 3 and 4, there are shown schematic illustrations of the cosmetic-product packaging 100 in an open state. As may be seen, the outer container 102 accommodates the inner container 302. The inner container 302 is mountable within the outer container 102. Notably, the inner container 302 accommodates at least one cosmetic product (not shown). Notably, the inner container 302 is user-accessible when the lid 104 is in an open position, wherein the distal end of the at least one lid projecting tab 104A and 104B and the distal end of the at least one container projecting tab 102A and 102B are spatially mutually separated, for accessing the at least one cosmetic product. The inner container 302 has the optional lid 304 that covers the inner container 302 from a side, such as top, thereof. Moreover, the inner container 302 has planar side panels 306, 308 and 310 that abut to the planar side panels of the outer container 110, 112 and 114, when the inner container 302 is accommodated within the outer container 102. In addition, the planar end panels 312 and 314 abut the planar end panels of the outer container 106 and 108, when the inner container 302 is accommodated within the outer container 102.

Figure 5A:
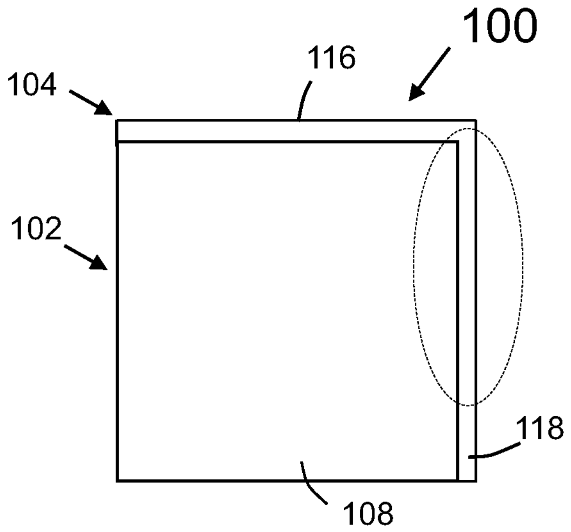
FIGS. 5A and 5B are schematic illustrations of side views of a cosmetic-product packaging in a closed state, in accordance with one or more embodiments of the present invention.
Figure 5B:
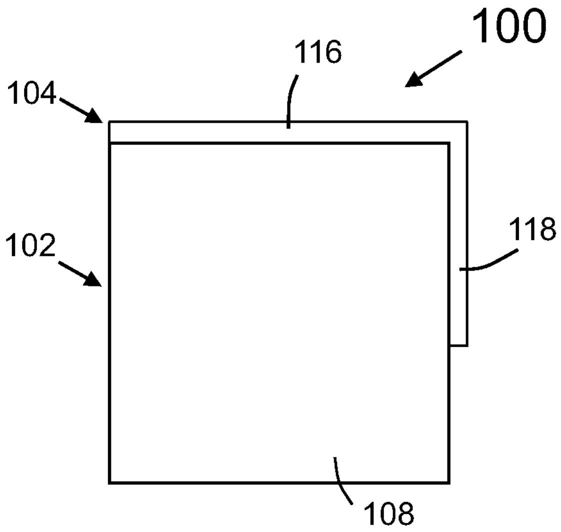

In FIG. 5A, there is provided an illustration of a side view of the cosmetic-product packaging 100 in a closed state with the second planar lid panel 118 extending down up to length of the planar side panel 110, in accordance with one example embodiment. Furthermore, in FIG. 5B, there is provided an illustration of a side view of the cosmetic-product packaging 100 with the second planar lid panel 118 extending down partially up to about half the length of the planar side panel 110, in accordance with one example embodiment. The second planar lid panel 118 is usable to block access to the inner container 302. Optionally, the second planar lid panel 118 covers the one of the planar side panels, such as 110, that is provided with the at least one container projection tabs 102A and 102B, up until the full length or middle of the one of the planar side panels, such as 110, as shown in FIG. 5A and FIG. 5B respectively.

Figure 5C:
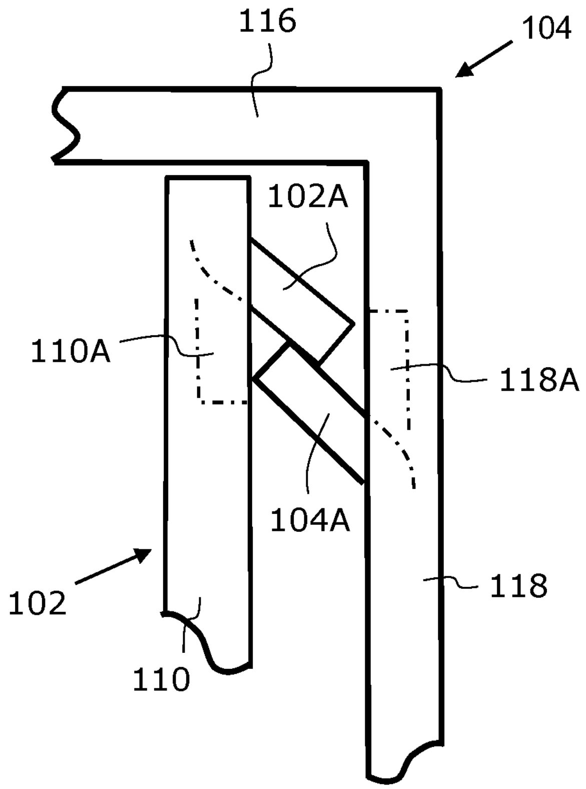
FIG. 5C is an enlarged view of a portion of the cosmetic-product packaging of FIG. 5A, in accordance with an embodiment of the present invention.

In FIG. 5C, there is provided an illustration of an enlarged view of a circled portion of the cosmetic-product packaging 100 in FIG. 5A. As illustrated in FIG. 5C, the corresponding at least one container projecting tab 102A and 102B and the at least one lid projecting tab 104A and 104B mutually cooperate and engage elastically at their distal ends for repetitive disengagement of the lid 104 from the outer container 102. The plurality of mutually cooperating tabs 102A, 102B, 104A and 104B attach, by means of clipping, at their distal ends to provide a secured cosmetic-product packaging 100 and provides protection to the cosmetic products (not shown) therein. It will be appreciated that the plurality of mutually cooperating tabs 102A, 102B, 104A and 104B provide an equal and opposite force on their corresponding mutually cooperating counterparts 104A, 104B, 102A and 102B respectively.

Figure 6A:
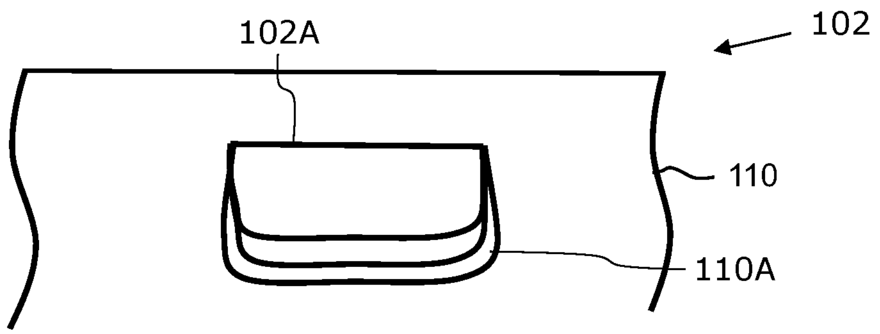
FIGS. 6A and 6B are schematic illustrations of a container projecting tab and a lid projecting tab respectively, in accordance with an embodiment of the present invention.
Figure 6B:
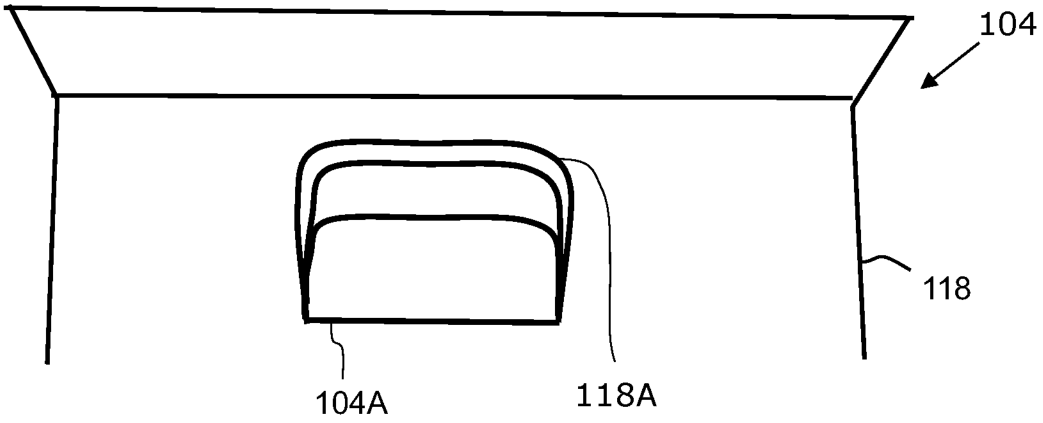

Referring to FIGS. 6A and 6B, there are shown schematic illustrations of a container projecting tab 102A and a lid projecting tab 104A respectively, in accordance with an embodiment of the present invention. The container projecting tab 102A and the lid projecting tab 104A are integral to the container 102 and the lid 104. The container projecting tab 102A and the lid projecting tab 104A are formed by cutting into a material, such as the single sheet of paper- or cardboard-containing material of the outer container 102 and the lid 104. The cutting into the single sheet of paper- or cardboard-containing material of the at least one of the planar side panel, such as 110, of the container 102 and the second planar lid panel 118 of the lid 104 results in formation of tab slots 110A and 118A in the at least one of the planar side panel, such as 110, of the container 102 and the second planar lid panel 118 of the lid 104.

Figure 7A:
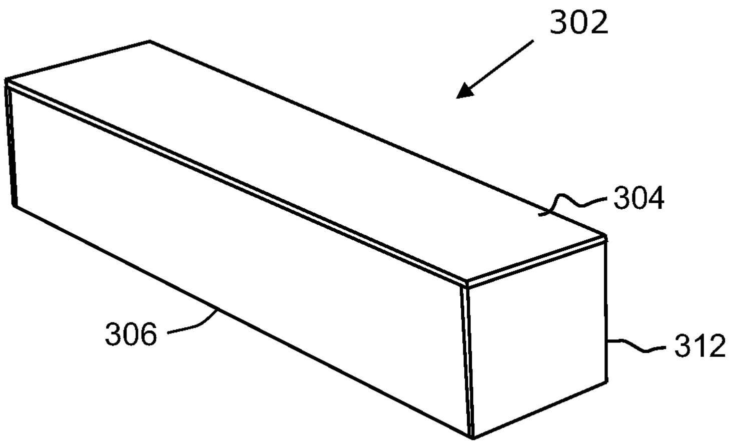
FIGS. 7A and 7B are schematic illustrations of an inner container in a closed and an open state respectively, in accordance with an embodiment of the present invention.
Figure 7B:
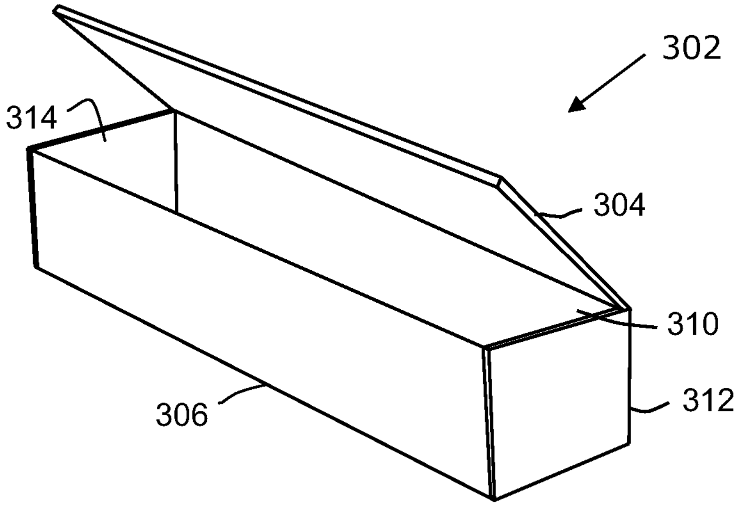

Referring to FIGS. 7A and 7B, there are shown schematic illustrations of the inner container (such as the inner container 302 of FIG. 3) in a closed and an open state respectively, in accordance with an embodiment of the present invention. The optional lid 304 of the inner container 302 closes the inner container 302 from the top of the inner container 302, thereby making the inner container 302 and the cosmetic products therein inaccessible for use by the user, when the inner container 302 is in a closed state. In an open state, the optional lid 304 of the inner container 302 is folded back by lifting the optional lid 304 of the inner container 302 in order to access the inner container 302 and the cosmetic products therein for use by the user.

Figure 8:
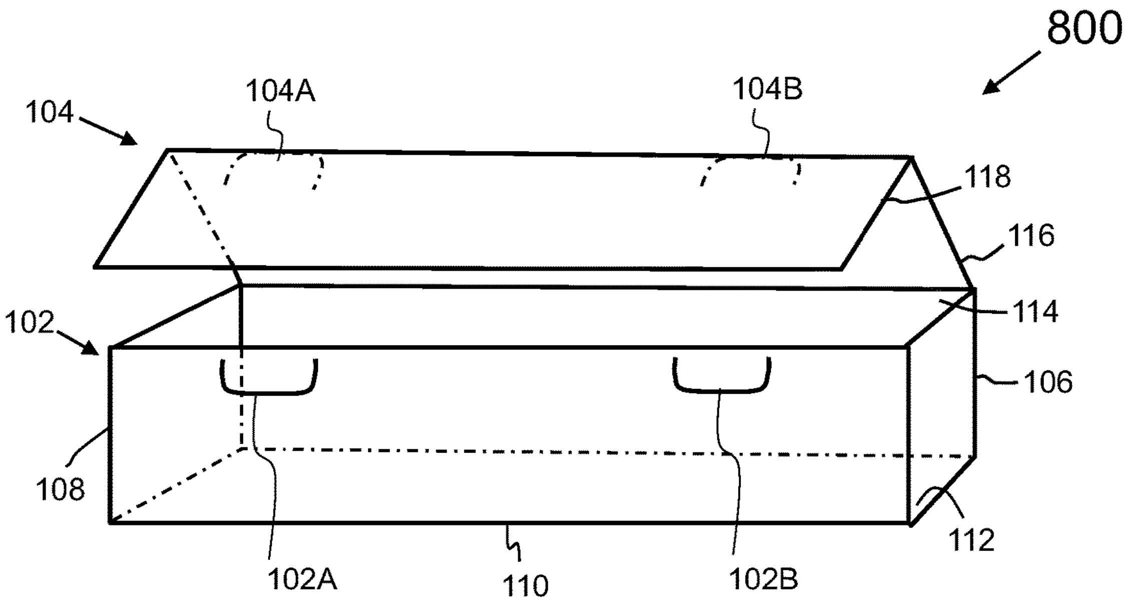
FIG. 8 is a schematic illustration of a front perspective view of a cosmetic-product packaging in a partly open state, in accordance with another embodiment of the present invention.

Referring to FIG. 8, there is shown a schematic illustration of a front perspective view of a cosmetic-product packaging 800 in a partly open state, in accordance with another embodiment of the present invention. Herein, the at last one container projecting tabs 102A and 102B and the at least one lid projecting tabs 104A and 104B are provided proximal to edges of the one of the planar side panels, such as 110, of the outer container 102 and the second planar lid panel 118 of the lid 104 respectively. The lid projecting tabs 104A and 104B clip onto the corresponding distal end of the at least one container projecting tab 102A and 102B to secure the lid 104 in a closed position to the outer container 102.

Figure 9:
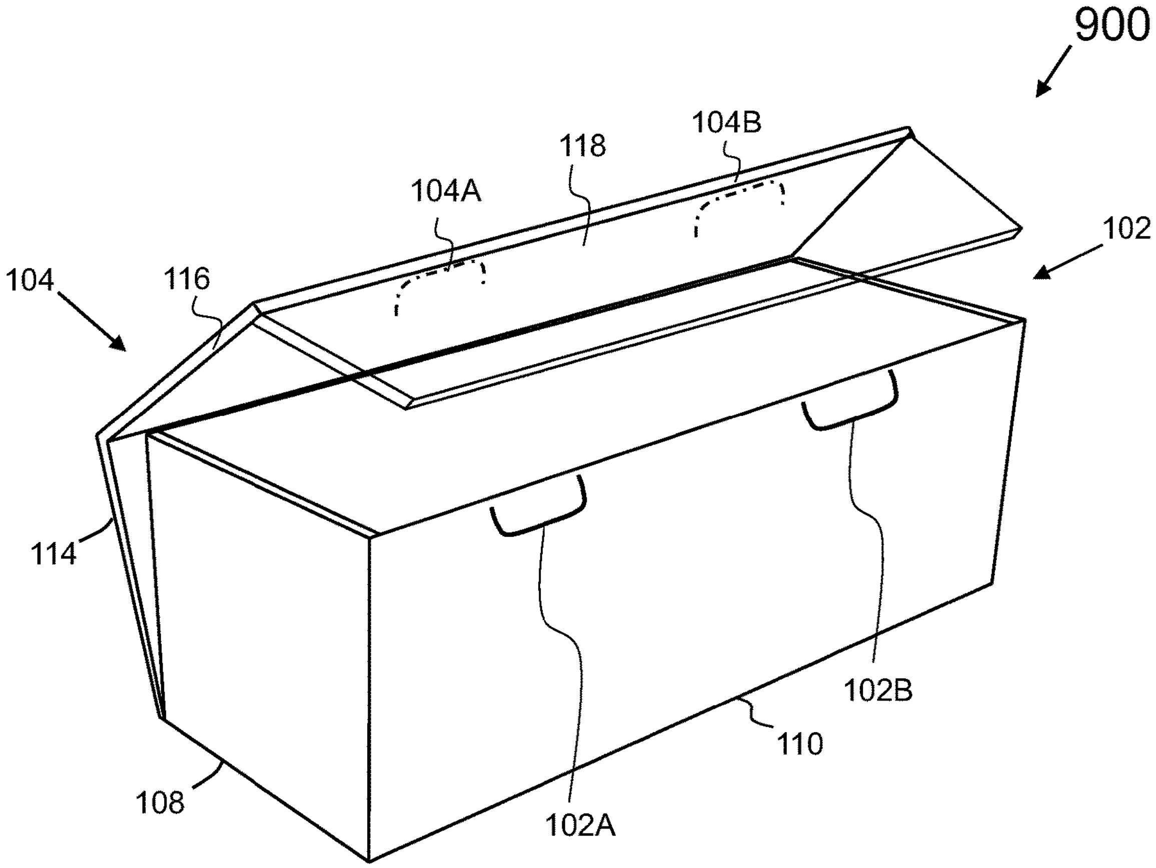
FIG. 9 is a schematic illustration of a top perspective view of a cosmetic-product packaging in an open state, in accordance with another embodiment of the present invention.

Referring to FIG. 9, there is shown a schematic illustration of a top perspective view of a cosmetic-product packaging 900 in an open state, in accordance with another embodiment of the present invention. Herein, an inner container (such as, the inner container 302 as shown in FIG. 3) accommodated in an outer container 102 thereof can be accessed from at least one open side of the outer container 102. Specifically, the inner container is accessible from two open adjacent planar side panels. In such case, the planar side panel adjacent to the top open side of the outer container extends into the lid 104, such that the lid appears to contain three planar sides 114 (otherwise, one of the planar side panels of the outer container 102 of FIG. 1), 116 and 118.

Modifications to embodiments of the present invention described in the foregoing are possible without departing from the scope of the present invention as defined by the accompanying claims. Expressions such as "including", "comprising", "incorporating", "have", "is" used to describe and claim the present invention are intended to be construed in a non-exclusive manner, namely allowing for items, components or elements not explicitly described also to be present. Reference to the singular is also to be construed to relate to the plural.

The invention claimed is:

1. A cosmetic-product packaging, characterized in that the cosmetic-product packaging includes:

(i) an outer container having a plurality of planar side panels, and a lid that is pivotally coupled to the outer container, characterized in that the outer container and the lid are provided with at least one container projecting tab and at least one lid projecting tab respectively, characterized in that a distal end of the at least one lid projecting tab clips onto a distal end of the at least one container projecting tab to secure the lid in a closed position to the outer container;

(ii) an inner container that is mountable within the outer container, characterized in that, in operation, the inner container accommodates at least one cosmetic product, and the inner container is accommodated within the outer container; and (iii) the inner container is user-accessible when the lid is in an open position, characterized in that the distal ends of the projecting tabs are spatially mutually separated, for accessing the at least one cosmetic product wherein the inner container comprises customizable holding tabs to ensure a snug fit of the at least one cosmetic product therein, and wherein at least one of the planar side panels of the outer container is arranged to be reflective for use in application of the one or more cosmetic products.

2. The cosmetic-product packaging of claim 1, characterized in that the outer container has an elongate rectilinear shape, characterized in that the outer container includes planar end panels at two ends of the outer container, and characterized in that the lid includes a plurality of planar lid panels that are mutually pivotally attached, characterized in that a first planar lid panel is pivotally attached along an elongate edge of one of the plurality of planar side panels of the outer container, and characterized in that a second planar lid panel is provided with the at least one lid projecting tab, and one of the plurality of planar side panels of the outer container is provided with the at least one container projecting tab, such that the second planar lid panel is abutting in operation to at least one of the plurality of planar side panels of the outer container when the lid is in the closed position, and the first planar lid panel prevents access to the inner container when the lid is in the closed position.

3. The cosmetic-product packaging of claim 1, characterized in that the outer container has an elongate length in a range of 5 cm to 20 cm along an elongate axis of the outer container, and a lateral width in a range of 1 cm to 4 cm in a lateral axis of the outer container, characterized in that the elongate axis is orthogonal to the lateral axis.

4. The cosmetic-product packaging of claim 1, characterized in that the tabs are formed by using plastic material inserts that are applied to the outer container and the lid during manufacturing thereof.

5. The cosmetic-product packaging of claim 1, characterized in that one or more planar panels of the outer container and the lid are fabricated as multi-layer structures.

6. The cosmetic-product packaging of claim 1, characterized in that at least one of the planar panels of the outer container and its lid is secured by adhesive bonding.

7. The cosmetic-product packaging of claim 1, characterized in that one or more external surfaces of the outer container and the lid have a wipe-clean surface coating.

8. The cosmetic-product packaging of claim 1, characterized in that the inner container is fabricated from a porous material that, in operation, absorbs liquid spills or oozing from the at least one cosmetic product.

9. The cosmetic-product packaging of claim 1, characterized in that the lid and the outer container each include a plurality of mutually cooperating tabs.

10. The cosmetic-product packaging of claim 1, characterized in that the inner container is of a rectilinear shape with planar side panels that abut to the planar side panels of the outer container, when the inner container is accommodated within the outer container.

11. The cosmetic-product packaging of claim 1, characterized in that planar panels of the inner container completely surround the at least one cosmetic product when the inner container is accommodated within the outer container.

12. The cosmetic-product packaging of claim 1, characterized in that one or more surfaces of the planar panels of the outer container are provided with a finish onto which graphical images are susceptible to being printed.

13. The cosmetic-product packaging of claim 1, characterized in that at least one of the plurality of planar side panels are fabricated from at least one flexible plastics material that transmits electromagnetic radiation in a wavelength range to which a human eye responds but attenuates radiation in an ultra violet (UV) electromagnetic wavelength range.

14. The cosmetic-product packaging of claim 1, characterized in that one of the plurality of planar side panels is arranged to have an elastic strap thereon configured to secure one or more objects therein.

15. A method of (for) manufacturing a cosmetic-product packaging, characterized in that the method includes:

(i) fabricating an outer container having a plurality of planar side panels, and a lid that is pivotally coupled to the outer container, and providing the outer container and the lid with at least one container projecting tab and at least one lid projecting tab respectively, characterized in that a distal end of the at least one lid projecting tab clips onto a distal end of the at least one container projecting tab to secure the lid in a closed position to the outer container;

(ii) fabricating an inner container that is mountable within the outer container, characterized in that, in operation, the inner container accommodates at least one cosmetic product, and the inner container is accommodated within the outer container;

(iii) arranging for the inner container to be user-accessible when the lid is in an open position, characterized in that the distal ends of the projecting tabs are spatially mutually separated, for accessing the at least one cosmetic product;

(iv) arranging for the inner container to comprise customizable holding tabs to ensure a snug fit of the at least one cosmetic product therein; and (v) arranging for at least one of the planar side panels of the outer container to be reflective for use in application of the one or more cosmetic products.

16. The method according to claim 15, characterized in that the outer container has an elongate rectilinear shape, characterized in that the outer container includes planar end panels at two ends of the outer container, and characterized in that the lid includes a plurality of planar lid panels that are mutually pivotally attached, characterized in that a first planar lid panel is pivotally attached along an elongate edge of one of the plurality of planar side panels of the outer container, and characterized in that a second planar lid panel is provided with the at least one lid projecting tab, and one of the plurality of planar side panels of the outer container is provided with the at least one container projecting tab, such that the second planar lid panel is abutting in operation to at least one of the plurality of planar side panels of the outer container when the lid is in the closed position, and the first planar lid panel prevents access to the inner container when the lid is in the closed position.

17. The method according to claim 15, characterized in that the outer container has an elongate length in a range of 5 cm to 20 cm along an elongate axis of the outer container, and a lateral width in a range of 1 cm to 4 cm in a lateral axis of the outer container, characterized in that the elongate axis is orthogonal to the lateral axis.

18. The method according to claim 15, characterized in that the tabs are integral to the outer container and the lid, and are formed by cutting into a material of the outer container and the lid.

19. The method according to claim 15, characterized in that the tabs are formed by using plastic material inserts that are applied to the outer container and the lid during manufacturing thereof.

20. The method according to claim 15, characterized in that one or more planar panels of the outer container and the lid are fabricated as multi-layer structures.

* * * * *